US005797044A

United States Patent [19]
Lawther et al.

[11] Patent Number: 5,797,044
[45] Date of Patent: Aug. 18, 1998

[54] ONE-TIME-USE CAMERA WITH THROW-AWAY FOLDABLE CARRIER FOR FLAT BATTERY

[75] Inventors: Joel S. Lawther, East Rochester, N.Y.; Ralph M. Lyon, Marshfield, Wis.

[73] Assignee: Eastman Kodak Company, Rochester, N.Y.

[21] Appl. No.: 800,951

[22] Filed: Feb. 14, 1997

[51] Int. Cl.$^6$ ........................................ G03B 17/02
[52] U.S. Cl. ........................ 396/6; 396/448; 396/539
[58] Field of Search ........................... 396/6, 535, 539

[56] References Cited

U.S. PATENT DOCUMENTS

| Re. 26,181 | 4/1967 | Harvey et al. ............... 95/31 |
|---|---|---|
| 1,260,356 | 3/1918 | Folmer .......................... 354/206 |
| 2,989,906 | 6/1961 | Rentschler .................... 354/202 |
| 3,344,725 | 10/1967 | Finelli ............................ 354/288 |
| 3,481,261 | 12/1969 | Fischer et al. ................ 354/275 |
| 3,508,482 | 4/1970 | Taylor ........................... 354/288 |
| 3,511,146 | 5/1970 | Finelli et al. .................. 354/288 |
| 3,524,393 | 8/1970 | Greger et al. ................. 354/288 |
| 3,535,996 | 10/1970 | Winkler et al. ............... 354/288 |
| 3,537,370 | 11/1970 | Wareham ...................... 354/288 |
| 3,543,662 | 12/1970 | Erlichman ..................... 354/202 |
| 3,682,060 | 8/1972 | Furuta ........................... 95/11 R |
| 3,754,453 | 8/1973 | Ernisse et al. ................ 354/288 |
| 3,833,427 | 9/1974 | Land et al. .................... 354/202 |
| 3,877,045 | 4/1975 | Bloom et al. .................. 354/202 |
| 3,943,537 | 3/1976 | Lange ........................... 354/288 |
| 3,967,292 | 6/1976 | Delahunt ....................... 354/174 |
| 3,988,751 | 10/1976 | Goto ............................. 354/288 |
| 3,994,004 | 11/1976 | Bachelder ..................... 354/202 |
| 4,041,514 | 8/1977 | Johnson ........................ 354/288 |
| 4,086,606 | 4/1978 | Finelli et al. .................. 354/288 |
| 4,091,400 | 5/1978 | Land .............................. 354/202 |
| 4,109,264 | 8/1978 | Pizzuti et al. ................. 354/288 |
| 4,153,362 | 5/1979 | Dietz et al. ................... 354/288 |
| 4,188,105 | 2/1980 | Erlichman ..................... 354/202 |
| 4,351,599 | 9/1982 | Suzuki et al. ................. 354/288 |
| 4,427,748 | 1/1984 | Land .............................. 354/202 |
| 4,645,325 | 2/1987 | Inoue et al. ................... 354/484 |
| 4,736,219 | 4/1988 | Yamanaka et al. ........... 354/288 |
| 4,896,178 | 1/1990 | Ohmura et al. ............... 354/288 |
| 5,000,396 | 3/1991 | Barrella ......................... 354/275 |
| 5,001,505 | 3/1991 | Tosaka et al. ................ 354/288 |
| 5,036,343 | 7/1991 | Yamanaka ..................... 354/288 |
| 5,079,584 | 1/1992 | Nakamura ..................... 354/484 |
| 5,155,512 | 10/1992 | Leonard ......................... 396/539 |
| 5,296,315 | 3/1994 | Rein ............................... 354/484 |
| 5,394,214 | 2/1995 | Petruchik ....................... 354/288 |

*Primary Examiner*—David M. Gray
*Attorney, Agent, or Firm*—Roger A. Fields

[57] ABSTRACT

A compact camera such as a one-time-use camera comprises a camera body and a throw-away carrier-with-battery unit. The throw-away carrier-with-battery unit is connected to the camera body to be supported for movement between one position, substantially against the camera body, and another position, extended from the camera body, and is disconnectable from the camera body to permit the throw-away carrier-with-battery unit to be replaced with a fresh one. Since, in the case of a one-time-use camera, the carrier-with-battery unit must be replaced with a fresh one for the camera electronics to be suitably powered, unauthorized recycling of the one-time-use camera is made difficult.

Preferably, the camera body has a lens opening which contains a taking lens, and the throw-away carrier-with-battery unit is configured to cover the lens opening when the carrier-with-battery unit is moved to its one position and to uncover the lens opening when the carrier-with-battery unit is moved to its other position. Alternately, or in addition, the throw-away carrier-with-battery unit may include an integral throw-away flash illumination device.

6 Claims, 5 Drawing Sheets

ONE-TIME-USE CAMERA WITH THROW-AWAY FOLDABLE CARRIER FOR FLAT BATTERY

FIELD OF THE INVENTION

The invention relates generally to the field of photography, and in particular to a compact camera such as a one-time-use camera. More specifically, the invention relates to a throw-away carrier-with-battery unit for the compact camera.

BACKGROUND OF THE INVENTION

Film and cameras that are all in one, commonly referred to as single-use or one-time-use cameras, have become well known. Typically, the one-time-use camera is a simple point-and-shoot type comprising a plastic, inner, main body part which supports a fixed-focus taking lens, a film metering mechanism with a rotatably supported metering sprocket, a manual film advance thumbwheel, a single-blade shutter, a manual shutter release button, a frame counter for indicating the number of exposures remaining for picture-taking, a direct see-through viewfinder, a film cartridge, and in some models a fixed electronic flash. A pair of plastic front and rear cover parts house the main body part between them to complete the camera unit. The rear cover part connects to the main body part and/or to the front cover part to make the main body part light-tight. A decorative cardboard outer box contains the camera unit and has respective openings for the taking lens, the shutter release button, the film advance thumbwheel, the viewfinder, the frame counter, and a flash emission window for the electronic flash.

At the manufacturer, the film cartridge is placed in a cartridge chamber in the main body part and the front and rear cover parts are connected to the main body part and/or to the front cover part to complete the camera unit. Then, an exposed end of a take-up spool in a film supply chamber in the main body part is rotated to factory prewind substantially the entire length of an unexposed filmstrip from the film cartridge onto the take-up spool. Lastly, the outer box is placed on the camera unit.

During picture-taking, after the photographer takes a picture, he or she manually rotates the thumbwheel to rotate a film spool of the film cartridge, in order to wind an exposed frame of the filmstrip into the film cartridge and to unwind an unexposed frame from the take-up spool. The winding movement of the filmstrip the equivalent of slightly more than one frame width rotates the metering sprocket to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel.

When the maximum number of exposures available on the filmstrip are exposed and the filmstrip is completely wound into the film cartridge, the one-time-use camera is given to a photofinisher who opens one end of the outer box and removes the camera unit. Then, he separates the rear cover part of the camera unit from the main body part of the camera unit, removes the film cartridge with the filmstrip from cartridge chamber in the main body part, and removes the filmstrip from the film cartridge to develop the negatives and make prints for the customer. The used camera parts are forwarded to the manufacturer for recycling, i.e. remanufacture.

There is a need recognized in the industry to prevent unauthorized recycling of one-time-use cameras in order to maintain camera quality. Unauthorized recycled cameras may be of lesser quality than authorized recycled cameras.

SUMMARY OF THE INVENTION

According to one aspect of the invention, there is provided a compact camera such as a one-time-use camera comprising:

a camera body; and a throw-away carrier-with-battery unit connected to the camera body to be supported for movement between one position, substantially against the camera body, and another position, extended from the camera body, and being disconnectable from the camera body to permit the throw-away carrier-with-battery unit to be replaced with a fresh one. Since, in the case of a one-time-use camera, the carrier-with-battery unit must be replaced with a fresh one for the camera electronics to be suitably powered, unauthorized recycling of the one-time-use camera is made difficult.

Preferably, the camera body has a lens opening which contains a taking lens, and the throw-away carrier-with-battery unit is configured to cover the lens opening when the carrier-with-battery unit is moved to its one position and to uncover the lens opening when the carrier-with-battery unit is moved to its other position. Alternately, or in addition, the throw-away carrier-with-battery unit may include an integral throw-away flash illumination device.

According to another aspect of the invention, there is provided a throw-away battery carrier for a compact camera such as a one-time-use camera, comprising:

a carrier-with-battery unit; and coupling means for connecting the carrier-with-battery unit to a camera body to be supported for movement between one position, substantially against the camera body, and another position, extended from the camera body, and for disconnecting the carrier-with-battery unit from the camera body to permit the carrier-with-battery unit to be replaced with a fresh one.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Preferred Embodiment

Figure 1:
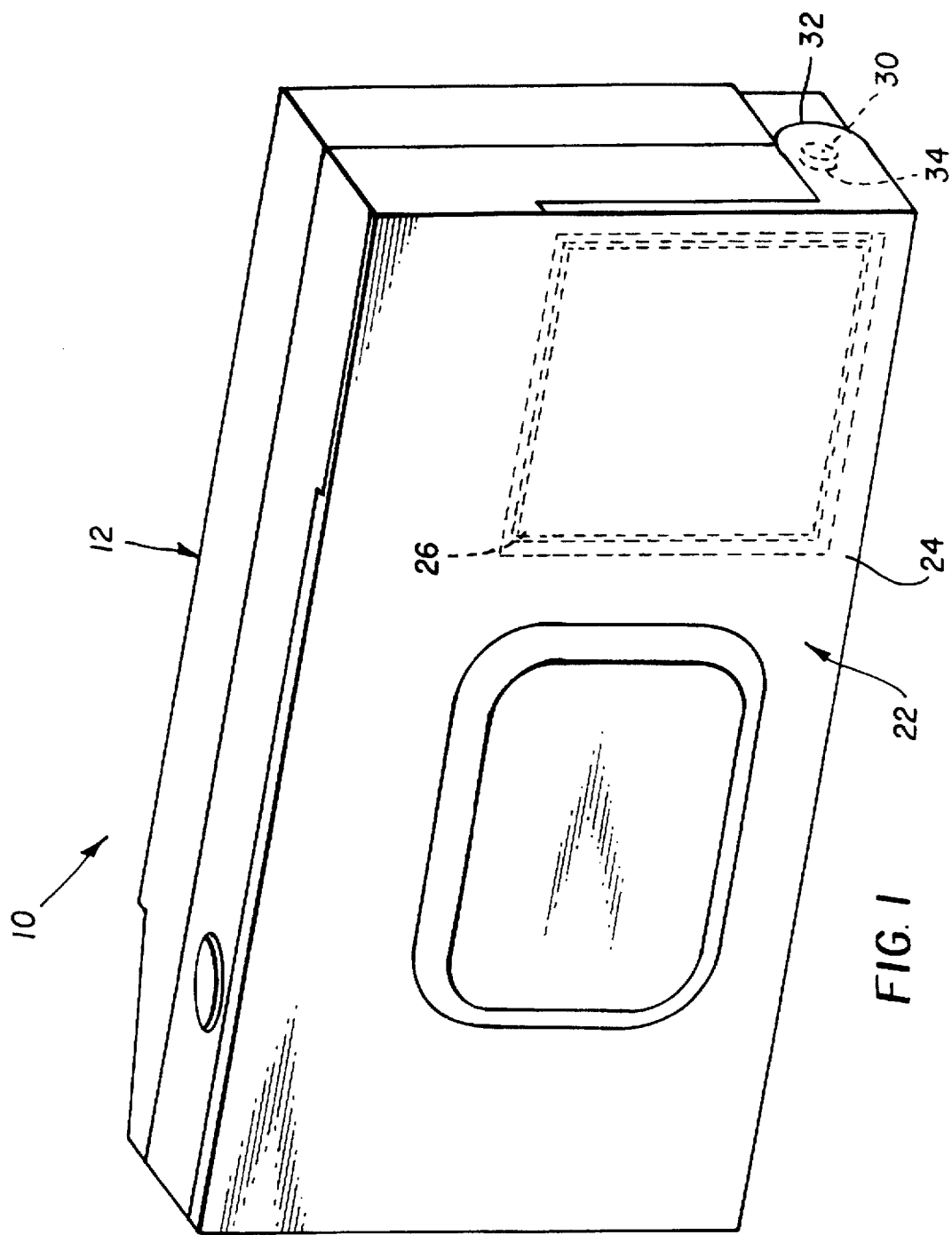
FIG. 1 is a front perspective view of a compact camera such as a one-time-use camera pursuant to a preferred embodiment of the invention, showing a throw-away carrier-with-battery unit in a folded position.
Figure 2:
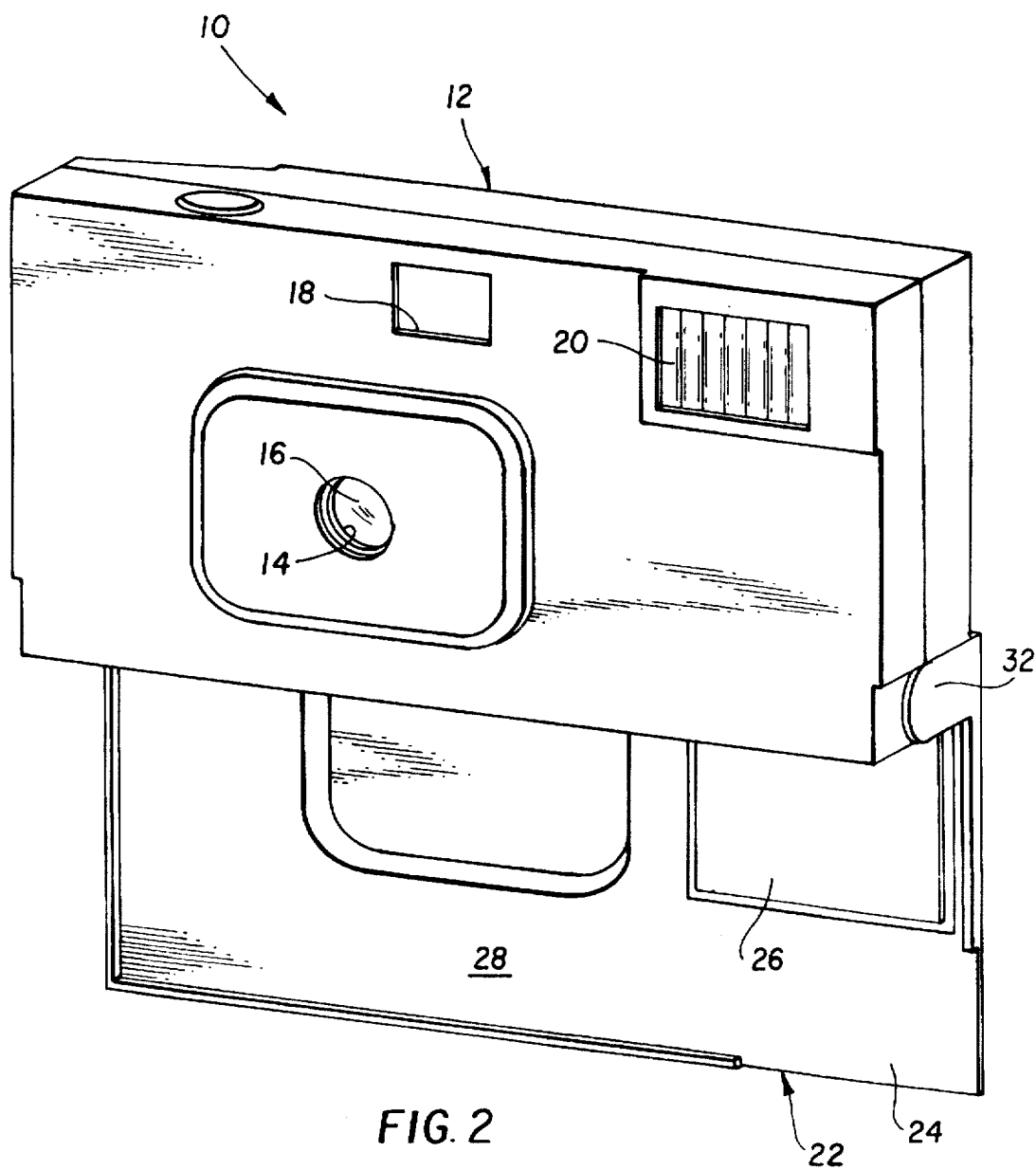
FIG. 2 is a front perspective view similar to FIG. 1, showing the throw-away carrier-with-battery unit in a non-folded or extended position.

Referring now to the drawings, FIGS. 1 and 2 show a compact camera such as a one-time-use camera 10 having a camera housing or body 12 including a lens opening 14 for a taking lens 16, a front viewfinder opening 18 and a flash emission window 20 of a known flash illumination device (not shown).

A throw-away, substantially flat, carrier-with-battery unit 22 comprises a carrier piece 24 and a flat, very thin, battery 26 fixed on one side 28 of the carrier piece. See FIGS. 1 and 2. A pair of coaxial pivot pins 30 (only one shown in FIG. 1) projecting inward from respective, integral, parallel swing arms 32 (only one shown in FIG. 1) of the carrier piece 24 are located within individual openings 34 (only one shown in FIG. 1) in the camera housing 12 to effect a pivotal coupling between the carrier-with-battery unit 22 and the camera housing. The carrier-with-battery unit 22 is manually pivotable relative to the camera housing 12 between a folded or covering position, shown in FIG. 1, in which the carrier piece 24 covers the lens opening 14 to protect the taking lens 16 and covers the front viewfinder opening 18 and the flash emission window 20, and a non-folded or extended position, shown in FIG. 2, in which the carrier piece is extended from the camera housing to uncover the lens opening, the front viewfinder opening and the flash emission window. The flat battery 26 lies between the one side 28 of the carrier piece 24 and the camera housing 12 to be concealed when the carrier-with-battery unit 22 is in its folded position.

The pair of swing arms 32 of the carrier piece 24 are resilient to permit one to manually flex the swing arms away from the camera housing 12 in order to remove the respective pivot pins 30 projecting from the swing arms from the individual openings 34 in the camera housing 12. In this way, the carrier-with-battery unit 22 is disconnected from the camera housing 12 to be replaced with a fresh one when the one-time-use camera 10 is recycled.

Alternate Embodiment

Figure 3:
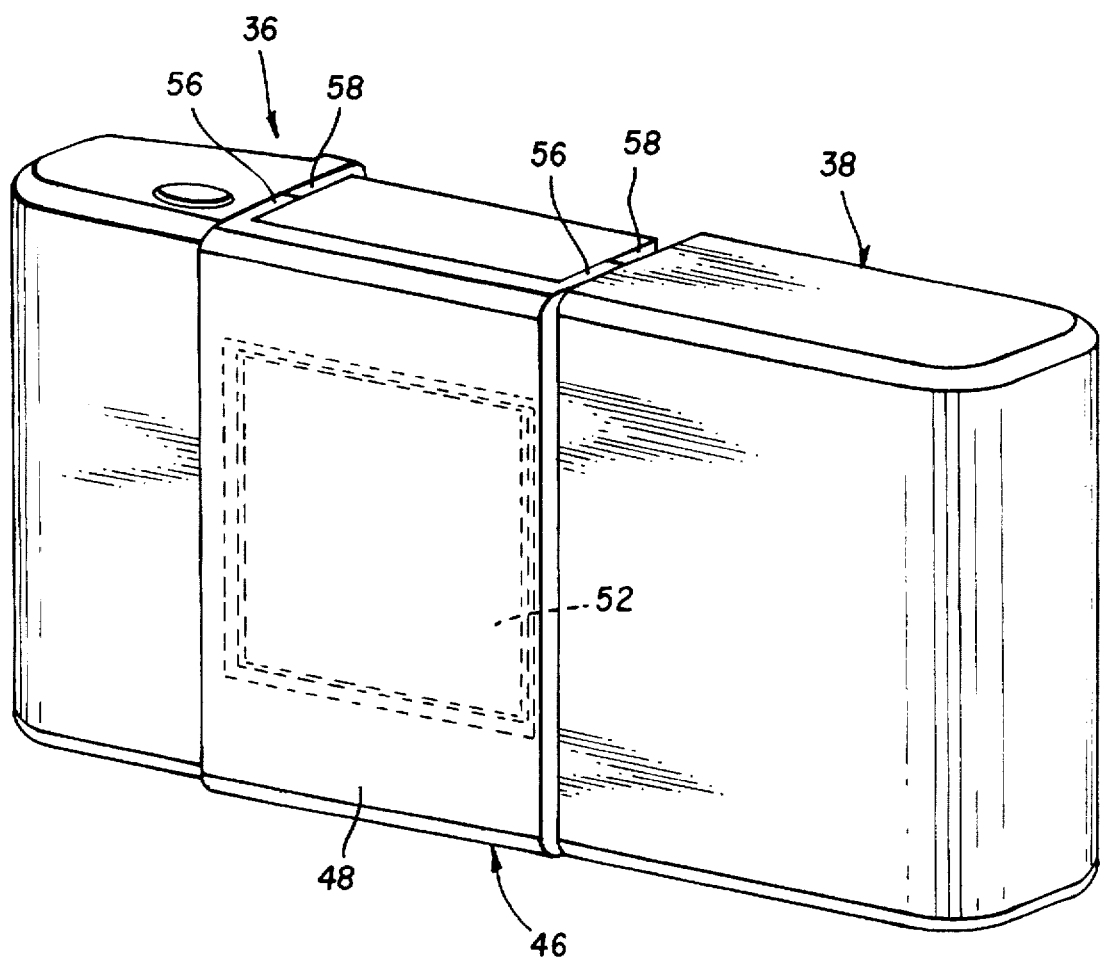
FIG. 3 is a front perspective view of a compact camera such as a one-time-use camera pursuant to an alternate embodiment of the invention, showing a throw-away carrier-with-battery unit in a folded position.
Figure 4:
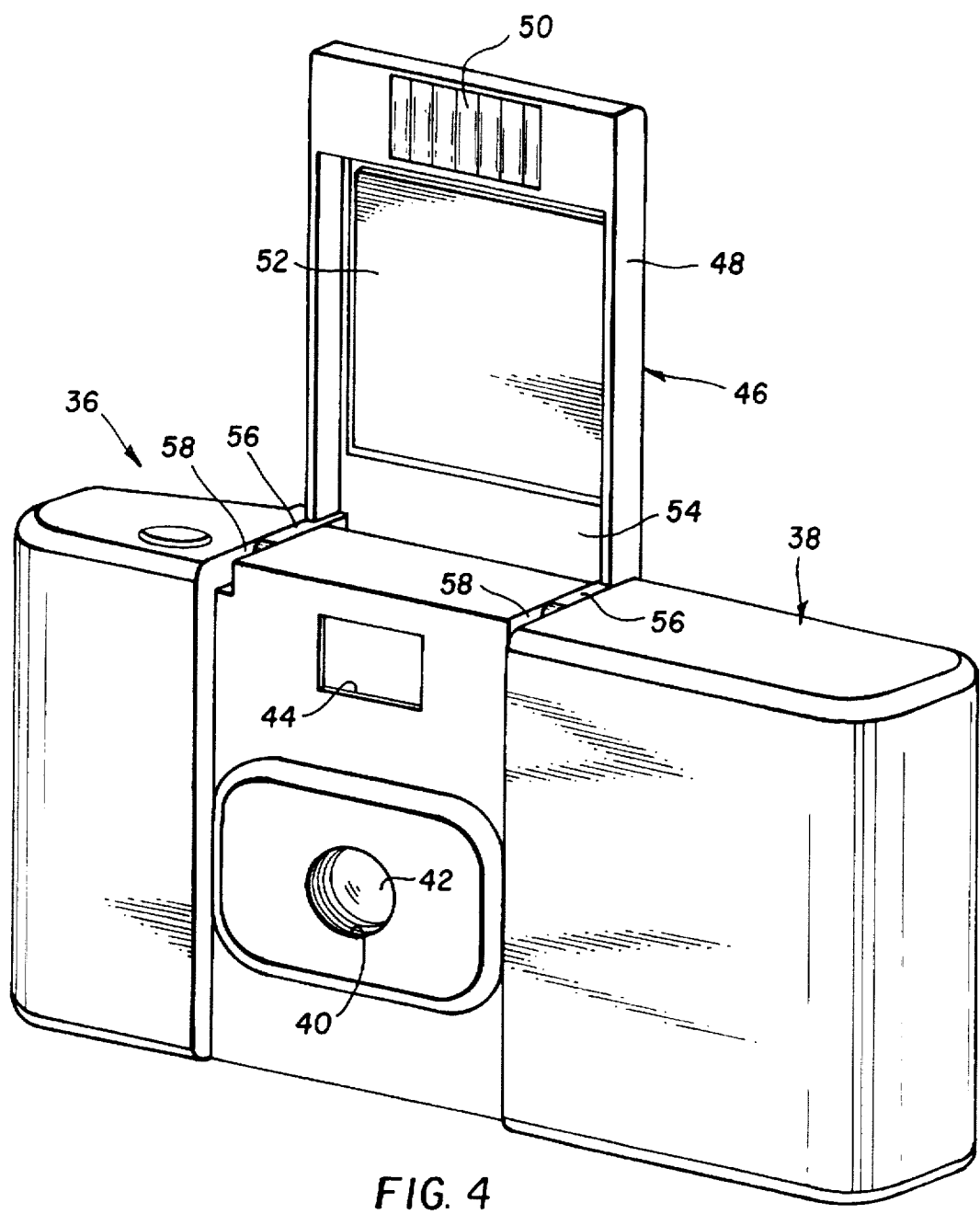
FIG. 4 is a front perspective view similar to FIG. 3, showing the throw-away carrier-with-battery unit in a non-folded or extended position.
Figure 5:
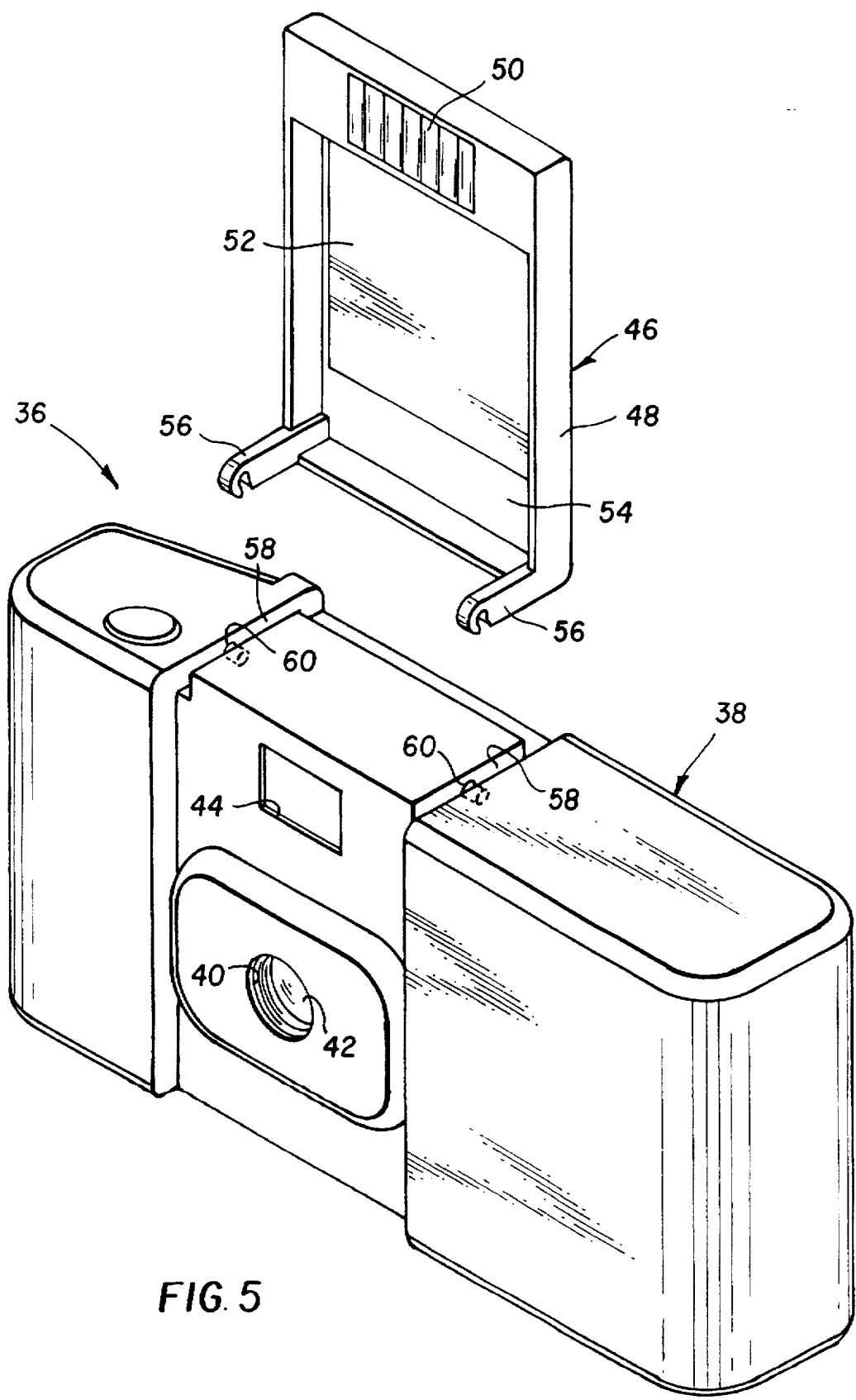
FIG. 5 is front perspective view similar to FIG. 4, showing the throw-away carrier-with-battery unit disconnected from the camera body.

FIGS. 3–5 show a compact camera such as a one-time-use camera 36 having a camera housing or body 38 including a lens opening 40 for a taking lens 42 and a front viewfinder opening 44.

A throw-away, substantially flat, carrier-with-battery unit 46 comprises a carrier piece 48, a flash emission window 50 of a known flash illumination device (not shown) and a flat, very thin, battery 52 fixed on the same side 54 of the carrier piece as the flash emission window. See FIGS. 4 and 5. A pair of integral, parallel swing arms 56 of the carrier piece 48 are located within respective slots 58 in the camera housing 38 in engagement with individual coaxial pivot pins 60 in the slots to effect a pivotal coupling between the carrier-with-battery unit 46 and the camera housing. The carrier-with-battery unit 46 is manually pivotable relative to the camera housing 38 between a folded position, shown in FIG. 3, in which the carrier piece 48 covers the lens opening 40 to protect the taking lens 42 and covers the front viewfinder opening 44, and a non-folded or extended position, shown in FIG. 4, in which the carrier piece is extended from the camera housing to uncover the lens opening and the front viewfinder opening. The flat battery 52 and the flash emission window 50 lie between the one side 54 of the carrier piece 48 and the camera housing 38 to be concealed when the carrier-with-battery unit 46 is in its folded position. The flash emission window 50 faces in the same general direction as the taking lens 42 when the carrier-with-battery unit 46 is in its non-folded position.

The pair of swing arms 56 of the carrier piece 48 are resilient to permit one to manually disengage the swing arms from the individual pivot pins 60 when the carrier-with-battery unit 46 is in its non-folded position. See FIG. 5. In this way, the carrier-with-battery unit 46 is disconnected from the camera housing 48 to be replaced with a fresh one when the one-time-use camera 36 is recycled.

The invention has been described with reference to a preferred embodiment. However, it will be appreciated that variations and modifications can be effected by a person of ordinary skill in the art without departing from the scope of the invention. For example, instead of the carrier-with-battery unit 22 being pivotable relative to the camera housing 12 between the covering and extended positions, it can be slidable relative to the camera housing between the two positions.

PARTS LIST 10. one-time-use camera
12. camera housing
14. lens opening
16. taking lens
18. front viewfinder opening
20. flash emission window
22. carrier-with-battery unit
24. carrier piece
26. flat battery
28. side
30. pivot pins (only one shown)
32. swing arms (only one shown)
34. openings (only one shown)
36. one-time-use camera
38. camera housing
40. lens opening
42. taking lens
44. front viewfinder opening
46. carrier-with-battery unit
48. carrier piece
50. flash emission window
52. flat battery
54. side
56. swing arms
58. slots
60. pivot pins

We claim:

1. A compact camera comprising:

a camera body; and a throw-away carrier-with-battery unit connected to said camera body to be supported for movement between one position, substantially against the camera body, and another position, extended from the camera body, and being disconnectable from said camera body to permit said throw-away carrier-with-battery unit to be replaced with a fresh one, wherein said camera body has a lens opening which contains a taking lens, and said throw-away carrier-with-battery unit is a lens shield configured to cover said lens opening when the carrier-with-battery unit is moved to its one position and to uncover the lens opening when the carrier-with-battery unit is moved to its other position.

2. A compact camera comprising:

a camera body; and a throw-away carrier-with-battery unit connected to said camera body to be supported for movement between one position, substantially against the camera body, and another position, extended from the camera body, and being disconnectable from said camera body to permit said throw-away carrier-with-battery unit to be replaced with a fresh one, wherein said throw-away carrier-with-battery unit includes a substantially flat battery and flash emission window fixed on a similar side of the throw-away carrier-with-battery unit.

3. A compact camera comprising:

a camera housing having a lens opening which contains a taking lens;

a lens shield connected to said camera housing for movement between one position, substantially against the camera housing to cover said lens opening, and another position, extended from the camera housing to uncover the lens opening; and a flat battery fixed on said lens shield to lie between the lens shield and said camera housing when the lens shield is moved to said one position.

4. A throw-away battery carrier for a compact camera such as a one-time-use camera, comprising:

a carrier-with-battery unit;

coupling means for connecting said carrier-with-battery unit to a camera body to be supported for movement between one position, substantially against the camera body, and another position, extended from the camera body, and for disconnecting said carrier-with-battery unit from the camera body to permit the carrier-with-battery unit to be replaced with a fresh one; and a substantially flat battery and flash emission window fixed on a similar side of said throw-away carrier-with-battery unit.

5. A throw-away battery carrier as recited in claim 4, including a substantially flat battery and flash emission window fixed on a similar side of said throw-away carrier-with-battery unit.

6. A throw-away battery carrier for a compact camera such as a one-time-use camera, comprising:

a substantially flat carrier-with-battery lens shield; and coupling means for connecting said carrier-with-battery lens shield to a camera body to be supported for movement between a covering position over a lens opening in the camera body and a non-covering position removed from the lens opening, and for disconnecting said carrier-with-battery lens shield from the camera body to permit the carrier-with-battery lens shield to be replaced with a fresh one.

* * * * *